C. W. GLIDDEN.
Machine for Forming Heel-Pile.

No. 224,012. Patented Feb. 3, 1880.

Witnesses.
Jos. P. Livermore
N. E. C. Whitney

Inventor.
Charles W. Glidden,
by Crosby Gregory
Attys

2 Sheets—Sheet 2.

C. W. GLIDDEN.
Machine for Forming Heel-Pile.

No. 224,012. Patented Feb. 3, 1880.

Witnesses.
Jos. P. Livermore
N. E. C. Whitney.

Inventor.
Charles W. Glidden,
by Crosby & Gregory Attys

UNITED STATES PATENT OFFICE.

CHARLES W. GLIDDEN, OF LYNN, MASSACHUSETTS.

MACHINE FOR FORMING HEEL-PILES.

SPECIFICATION forming part of Letters Patent No. 224,012, dated February 3, 1880.

Application filed November 24, 1879.

*To all whom it may concern:*

Be it known that I, CHARLES W. GLIDDEN, of Lynn, county of Essex, State of Massachusetts, have invented an Improvement in Machines for Forming Heel-Piles, of which the following description, in connection with the accompanying drawings, is a specification.

This invention relates to mechanism for forming from pieces of leather a heel-pile, or, as it is sometimes called, a "heel-sausage."

The object of the invention is to paste and firmly unite in a pile pieces of leather suitable for the formation of boot and shoe heels, the said pile, of any desired or suitable length, being subsequently subdivided into pieces suitable for heels.

In this my invention the plunger which acts upon and packs the small pieces of leather into the mold also pastes the pieces upon their upper sides. This paste is herein shown as supplied to the plunger from its hollow slide-rod containing a piston, which is automatically but slowly moved downward, so as to cause the paste to exude upon the face of the plunger.

Figure 2:
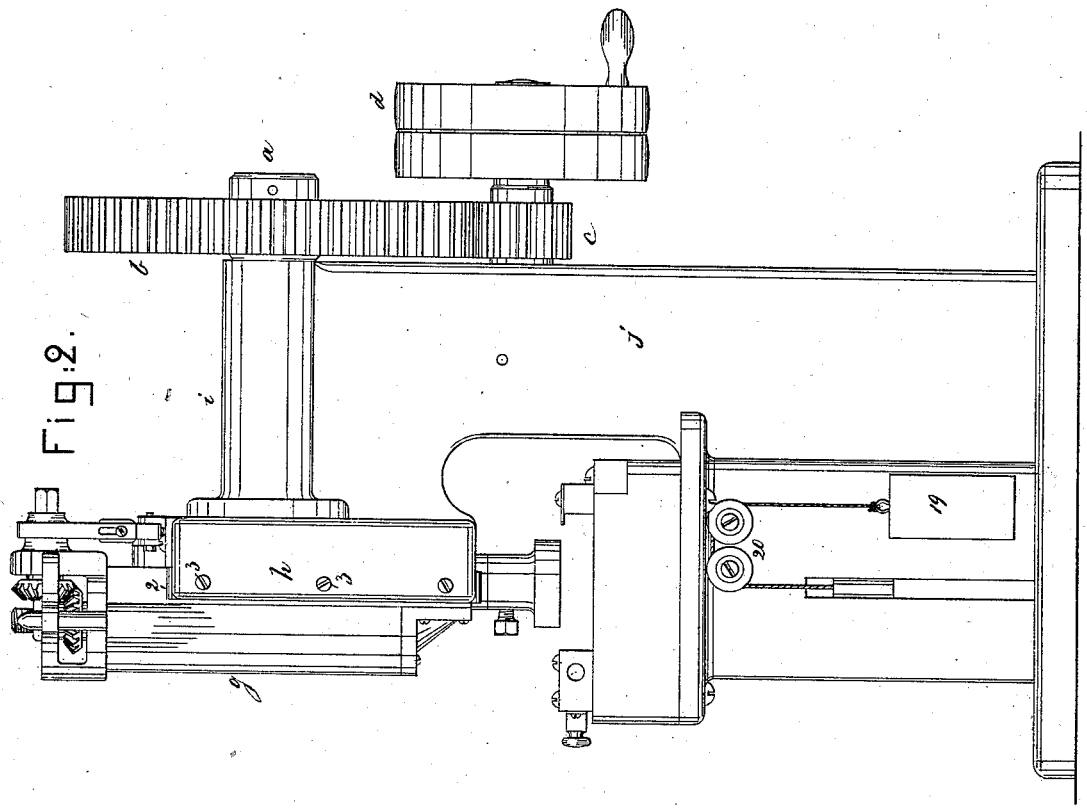
Figure 1:
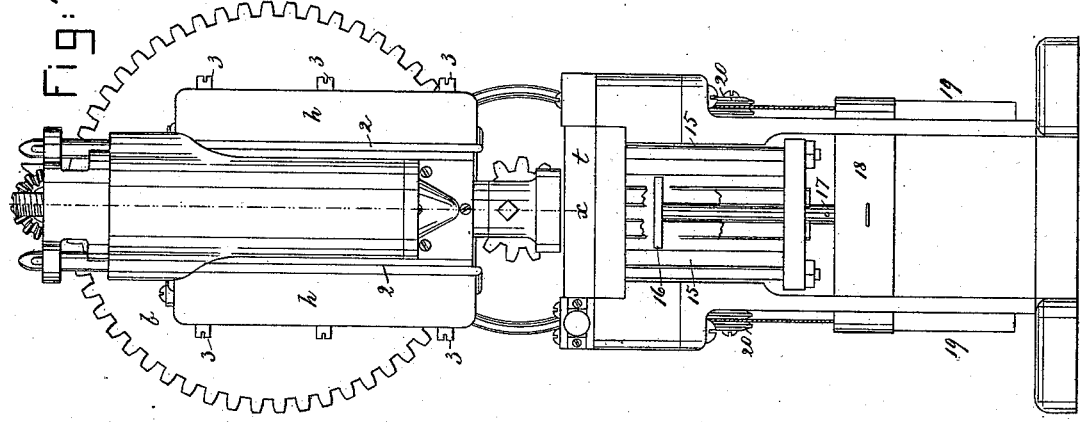
Figure 3:
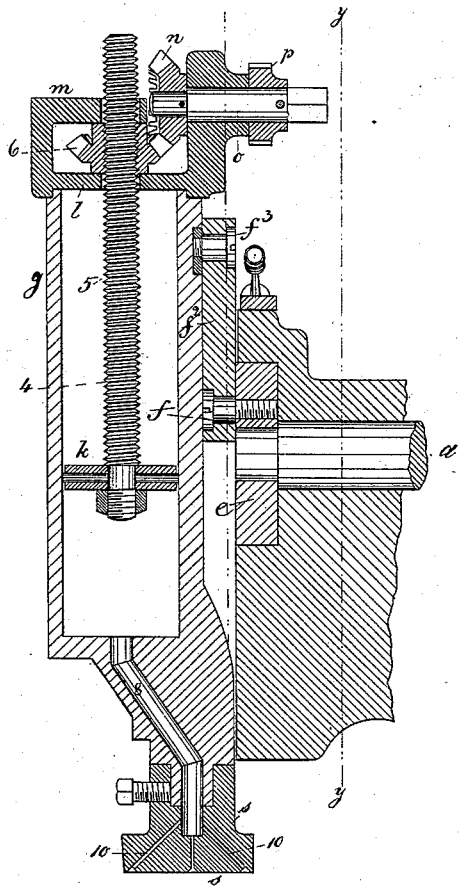
Figure 4:
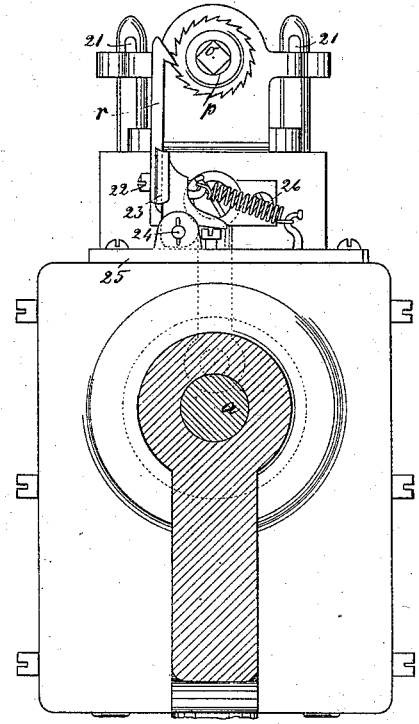
Figure 5:
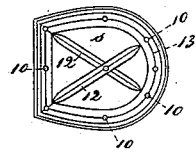
Figure 6:
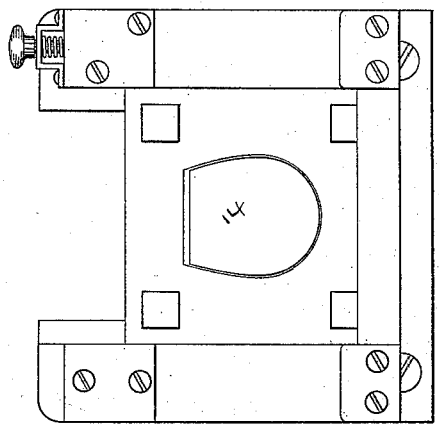

Figure 1 represents, in front elevation, a machine containing my invention; Fig. 2, a side elevation thereof; Fig. 3, a vertical section of part of the machine on the line $x$, Fig. 1; Fig. 4, a section on the line $y\ y$, Fig. 3, looking toward the front of the machine; Fig. 5, an under-side view of the plunger, and Fig. 6 a top view of the mold.

The main shaft $a$ of the machine, having a gear, $b$, and set in motion by the gear $c$, driven by a belt on a pulley, $d$, has at its forward end a disk, $e$, provided with a crank-pin, $f$, connected with the slide-rod $g$ by a link, $f^2$, and a stud, $f^3$, the said parts reciprocating the said slide-rod in suitable ways on the head $h$, forming part of the arm $i$, in which the shaft $a$ has its bearings. The arm $i$ is part of the frame-work $j$.

The head is provided with gibs 2 2, which press against the edges of the slide-rod $g$, and are made adjustable by the screws 3.

The slide-rod $g$ is made hollow (see Fig. 3) to form a paste-receptacle, 4. A piston, $k$, fits the receptacle 4 and rests on the paste, and the rod 5 of the piston has a screw-threaded portion, on which is fitted an internally-threaded bevel-gear, 6, seated between two plates, $l\ m$, and rotated by a bevel-gear, $n$, on a short shaft, $o$, provided with a ratchet-wheel, $p$, which is moved intermittingly by a pawl, $r$.

Such intermitting movement of the shaft $o$ and gear $n$ causes the piston $k$ to descend in the paste-receptacle as the slide $g$ is reciprocated, forcing the paste gradually along the channel 8, from which it passes into the grooves 10 of the plunger-head $s$, having grooves 12 13 at the lower side, as in Fig. 5, from which grooves the paste is delivered directly upon the surface of the piece or pieces of leather, which are acted upon and forced by the said plunger, at each descent, into the mold or receptacle $t$, having an opening, 14, in shape the same as the flat side of a heel-lift. This mold $t$ is supported on rods or bars 15, and the bottom plate, 16, of the mold is supported by a rod, 17, rising from a cross-bar, 18, held pressed upward with more or less force by suitable cords and weights 19 over pulleys 20, so that the bottom piece, 16, is permitted to gradually descend as the pieces of leather are pasted together and made in a pile in the said mold.

To elevate the piston, the shaft $o$ is shaped at one end so as to receive a key, by which it may be quickly turned.

The paste-receptacle may be filled by removing the pins 21 and lifting the plates $l\ m$ from the top of the slide-rod.

The pawl $r$ is adjustably connected, by a set-screw, 22, with the part 23 of the pawl, which is pivoted at 24 in an ear of a plate, 25, and the said pawl is raised and lowered so as to place its hook in such position as to operate the ratchet the distance of one or more teeth at each ascent of the slide-rod $g$. The spring 26 holds the pawl to the ratchet.

The heel-pile, of suitable length, is removed from the mold, after which it is sliced up into pieces suitable for heels. This slicing I prefer to do upon a machine represented in another application for United States Patent filed by me concurrently with this.

The plunger and mold are made removable in order to permit them to be changed for those of other sizes, as may be desired.

I claim—

1. In a heel-piling machine, the mold, combined with the paste-delivering mechanism, substantially as described.

2. The plunger grooved to receive and apply paste to the leather as it is being forced into the mold, substantially as described.

3. In a heel-piling machine, the hollow slide-rod and its attached plunger to apply paste to the leather, substantially as described.

4. The hollow slide-bar and its piston, combined with mechanism, substantially as described, to gradually move the piston down within the said slide-rod, substantially as set forth.

5. The pivoted pawl having an adjustable end piece, combined with the ratchet, the piston, and connecting devices, substantially as described, to intermittingly actuate the piston, as set forth.

6. The mold provided with the movable bottom piece, combined with the slide-bar and plunger and pasting mechanism to automatically paste and pile pieces of leather in the said mold for a heel-pile, substantially as set forth.

In testimony whereof I have signed my name to this specification in the presence of two subscribing witnesses.

CHARLES W. GLIDDEN.

Witnesses:
 G. W. GREGORY,
 JOS. P. LIVERMORE.